INVENTOR.
LEONARD SCHWARTZ
BY
*H.H. Mackey*
ATTORNEY

INVENTOR.
LEONARD SCHWARTZ

United States Patent Office 3,423,752
Patented Jan. 21, 1969

3,423,752
TRIANGULAR LINEAR ARRAY CONFIGURATION
Leonard Schwartz, Scarsdale, N.Y., assignor to General Precision Systems Inc., a corporation of Delaware
Filed Dec. 8, 1966, Ser. No. 600,172
U.S. Cl. 343—8                                    11 Claims
Int. Cl. G01s 9/44

ABSTRACT OF THE DISCLOSURE

A microwave antenna assembly is provided consisting of three conventional linear waveguide radiators arrayed in a triangular configuration. One linear waveguide is aligned along ground track and is adapted to be alternately fed from each end by a conventional CW Doppler transmitter. Two other identical linear waveguides are respectively disposed in coplanar relationship at 45° angles with reference to the transmitter waveguide and each is adapted to be alternately coupled at each end to a conventional CW Doppler receiver. Since at any given time the $\gamma$ function of the receiving aperture of the configuration is rotated 45° relative to the transmitted beam's $\gamma$ function, only a narrow portion corresponding to the latter's ground illumination pattern is effectively seen by the receiver. This narrow portion actually defines a new beam shape having minimal $\psi$ variance across its width and therefore its susceptibility to overwater "calibration shift" errors is markedly reduced.

---

Figure 1:
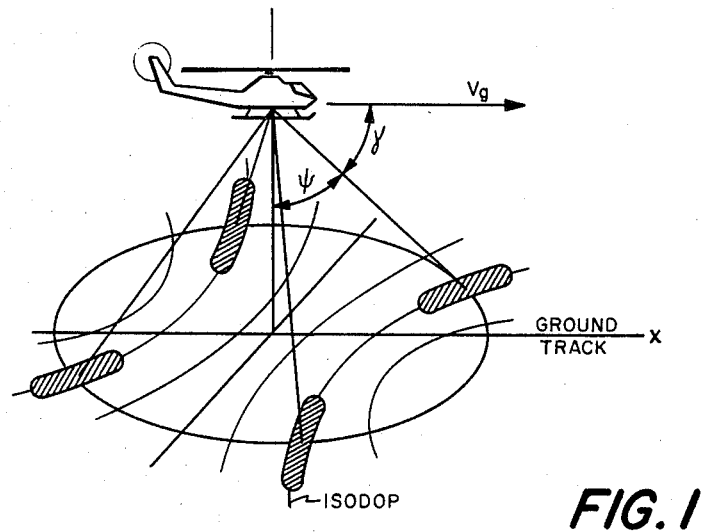

This invention relates generally to microwave antenna assemblies and more particularly to a novel triangular antenna array comprising linear waveguide radiators.

Airborne navigational equipments of the so-called Doppler type have received widespread acceptance in recent years.

In these systems, various inflight parameters such as, for example, velocity and drift angle are derived by measuring the Doppler frequency shift occurring between a transmitted microwave beam and the radiation backscattered from the earth's surface due to the relative movement between the aircraft and the ground.

It is well-known that such Doppler navigational systems incur an undesirable phenomenon called "calibration shift" which develops when the system in question passes from over land to over water. What actually happens is that the return signal strength decreases suddenly, and although the aircraft may be traveling at the same velocity a different Doppler shift is observed and consequently an erroneous velocity is read out aboard the aircraft. This arises from the fact that the amount of microwave energy backscattered toward the transmitting source is a function of the nature of the reflecting terrain. Backscattering from land is almost completely isotopic at all angles of incidence, so that the amount of energy received at the source is for all intents and purposes independent of the incidence angle. This is not true, however, when the microwave beam energy is reflected back to the source from a smooth surface such as water. In this case, the amount of energy in the return signal is not only a function of the nature of the water surface but of the angle incidence of the transmitted beam as well. Rough water backscatters more than smooth water does, and much more is backscattered at small angles of incidence than at large angles. By way of example, experiment has shown that at an angle of incidence of 33°, a water surface corresponding to 1 or 2 on the Beaufort wind scale has scatter properties reflecting 13 db less microwave signal than a land surface would have.

In view of the foregoing, many prior art solutions have been urged which purport to reduce calibration shift or, in the least, tend to minimize it. However, these solutions characteristically propose complex lobe switching techniques which in turn require rather involved microwave systems and/or antennas.

In contrast, the instant disclosure describes a simplified antenna assembly which relies upon beam shaping methods in lieu of lobe switching to improve overwater performance. Although the preferred form of antenna according to the present invention is specifically intended for use in continuous wave Doppler navigational systems, it should not be limited to same. On the contrary, it is anticipated that the same antenna design could be adapted to other microwave systems as well.

If the Doppler system is of the continuous wave type, another difficulty often encountered is the leakage of microwave energy from the transmitter into the receiver. This leakage signal represents unwanted noise and if it is large enough it could severely mask the Doppler information signal, thus seriously downgrading system performance. One way to eliminate leakage is to employ space duplexing techniques which require the use of separate, isolated transmitter and receiver components including separate T and R antenna sections. Since this involves added equipment it might appear, at first, not to be a complete solution. However, consider the possibility of designing an antenna assembly having separate T and R sections yet at the same time remaining simple, economical and light in weight. Space duplexing under these conditions would present an attractive alternate for eliminating the leakage problem.

Regarding the specific aspects of the instant case, a novel antenna assembly is proposed comprising three conventional linear waveguide radiators arrayed in a triangular configuration. One linear waveguide is aligned along ground track and is adapted to be alternately fed from each end by a conventional Doppler transmitter. Two other identical linear waveguides are respectively disposed at 45° angles with reference to the transmitter waveguide and each is adapted to be alternately coupled at each end to a conventional Doppler receiver. Since at any given time the $\gamma$ function of the receiving aperture of the configuration is rotated 45° relative to the transmitted beam's $\gamma$ function only a narrow portion corresponding to the latter's ground illumination pattern is effectively seen by the receiver. This narrow portion actually defines a new beam shape having minimal $\psi$ variance across its width and therefore its susceptibility to calibration shift is markedly reduced. The reasons for this will be explained in detail below.

Accordingly, it is the primary object of this invention to provide an improved antenna assembly suitable for use in Doppler navigational systems and capable of improved overwater operation without the complexity of lobe switching.

It is another object of this invention to provide a microwave antenna assembly which is low in cost, light in weight, and simple in construction.

It is yet a further object of this invention to provide a microwave antenna assembly comprising a triangular array of linear waveguide radiators.

It is still another object of this invention to provide a microwave antenna system for use in continuous wave Doppler systems and capable of improved overwater performance while at the same time permitting space duplexing.

Figure 2A:
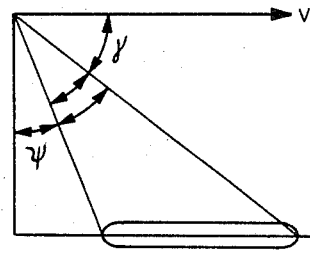
Figure 2B:
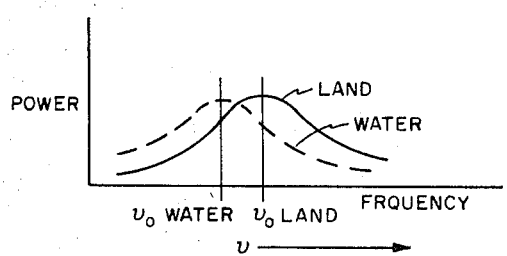
Figure 3:
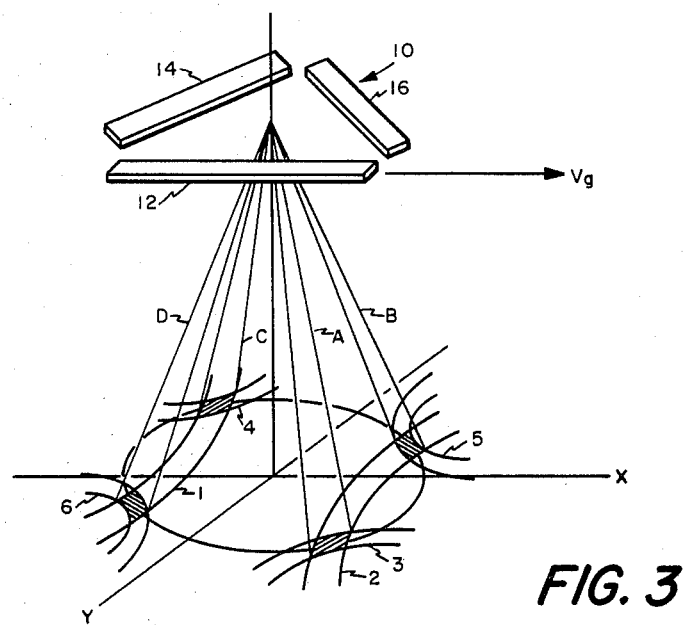
Figure 4:
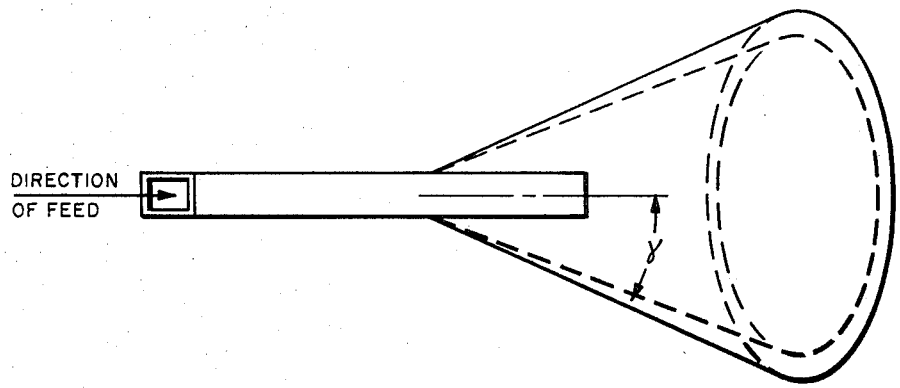
Figure 5:
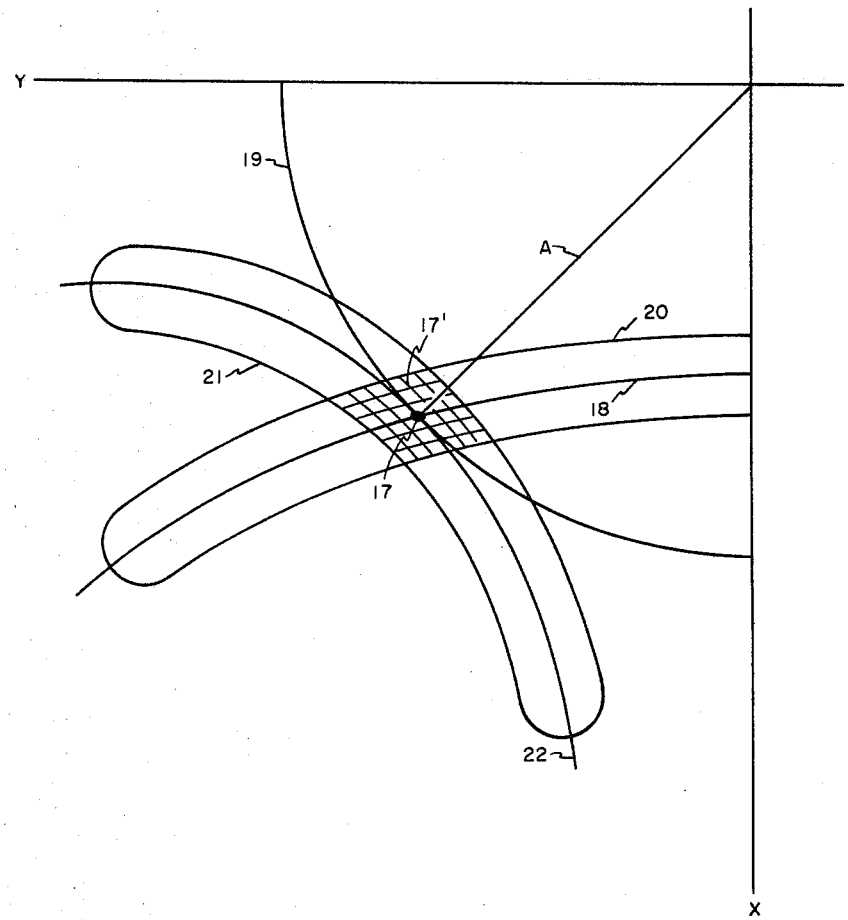
Figure 6:
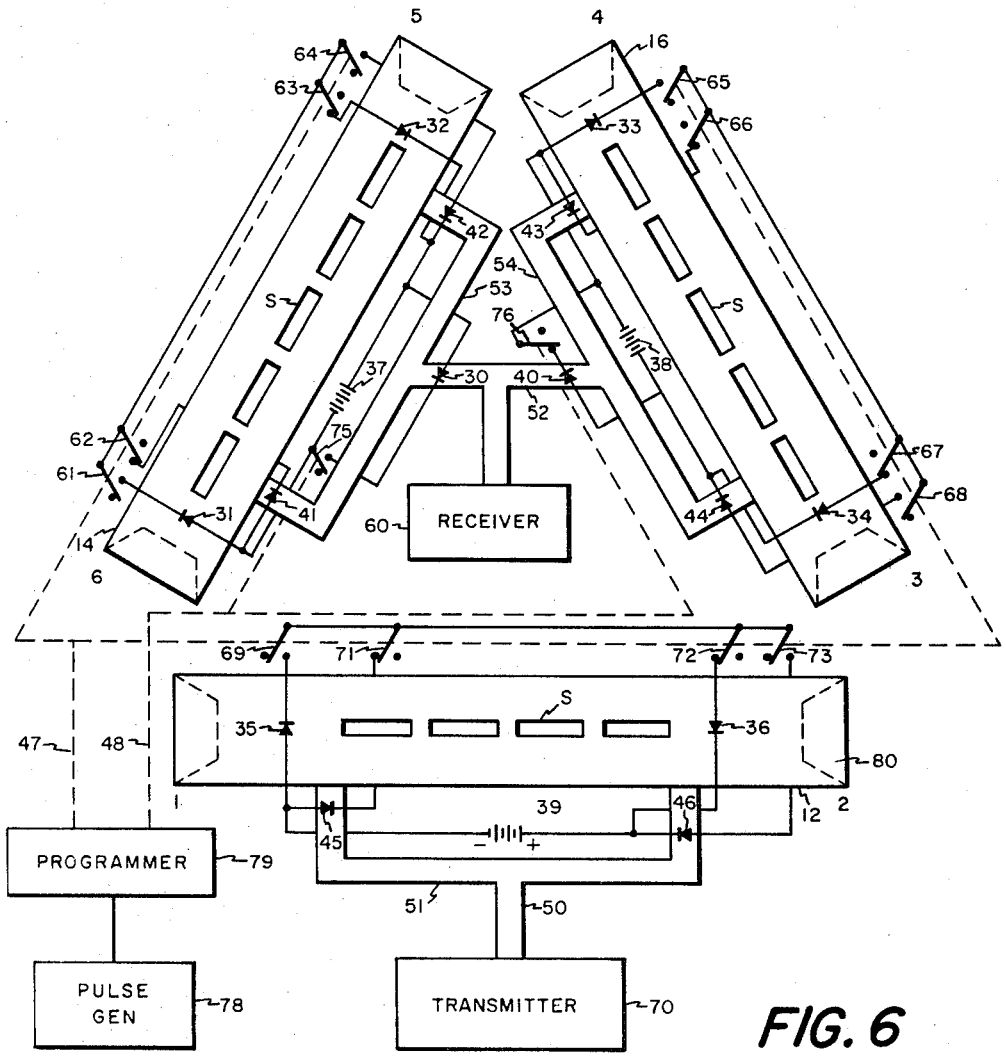

These and other objects and advantages will be apparent from a study of the following detailed description of the preferred form of the invention, read in connection with accompanying drawings wherein:

FIG. 1 is a sketch in perspective showing the beam configuration of a prior art Doppler system, FIG. 2a is a sketch and FIG. 2b is a curve plot explaining the nature of calibration shift, FIG. 3 is a sketch in perspective showing the beam configuration of the antenna according to the instant invention, FIG. 4 is a sketch representing the beam pattern of a linear waveguide, FIG. 5 is a geometrical detail explaining the nature of the composite beams generated by the antenna according to the present invention, and FIG. 6 is a schematic illustration of the antenna of the invention and the latter's control system.

In order to provide a context for the discussions which follow, the fundamental principles underlying the operation of Doppler navigational systems will be briefly described.

Consider a source of electromagnetic radiation with a wavelength $\gamma$ (frequency $f_0$) carried in an aircraft which is moving with a horizontal velocity $V_g$ with respect to the ground as generally represented in FIG. 1. The backscattered energy received at the source will be shifted in frequency due to the relative motion between the source and the scattering ground surface. This is the familiar Doppler effect. The difference between the transmitted and received frequencies, $\nu$, is given by the relation $$\nu = \frac{2v}{\lambda} \cos \gamma \quad (1)$$

where $\gamma$ is the angle between the direction of motion and the direction of radiation. The Doppler frequency difference or shift is therefore a direct function of the $\gamma$ angle. In fact, for any given velocity and frequency of radiation all scatterers on the ground which are situated on a locus defined by a constant $\gamma$ angle with respect to the horizontal velocity vector will yield the same Doppler shift. Furthermore, it can be shown that these scatterers lie along a hyperbolic curve defined by the intersection of a cone and the ground, the half angle of the cone being equal to $\gamma$. Accordingly, each curve in the family of hyperbolic curves corresponding to a constant Doppler shift contour is called an isodop. In FIG. 1 the slant range of the transmitted beam is defined by the angle psi ($\psi$). Obviously any change in the $\gamma$ function of the transmitted beam will be accompanied by a change in its $\psi$ function.

In order to extract ground speed and drift angle information from backscattered radiation, one well-known system commonly referred to as the Janus system uses four pulsed beams radiating in pairs, each pair appearing in alternating time sequence with respect to the other pair. FIG. 1 illustrates the general shape of the beam configuration of such a system. Fore-right and aft-left beams comprise one of the Janus pairs and fore-left and aft-right beams make up the other pair. By way of example, the Janus pairs may be alternately radiated at a switching rate of 1 c.p.s. However, it is to be noted that the individual beams also may be radiated continuously or serially on a time sharing basis.

The echo signal received via the forward looking beam of either Janus pairs will be raised in frequency to $f_o + \nu_f$. The return from the aft looking beam will be down shifted to $f_o - \nu_a$. By mixing these returns the result will be $(f_o + \nu_f) - (f_o - \nu_a)$ or $\nu_a + \nu_f$, the sum of the two Doppler shifts. If the beams of each pair are symmetrically disposed so that the $\gamma$ angles are supplementary, then $\nu_a = \nu_f$ and the Janus mixing process gives a Doppler frequency equal to twice the shift within each beam. The latter, of course, is proportional to ground speed $V_g$.

If the antenna axis is aligned to the velocity vector so that the beams of each pair have mirror symmetry relative to ground track, then the Doppler frequency measured by both Janus pairs will be equal. On the other hand, if the antenna is misaligned relative to the velocity vector, then the beams of one Janus pair will subtend a greater range of isodops, giving a higher net Doppler shift than the other pair. An error signal proportional to this information may then be used to servo the antenna to ground, the magnitude of rotation necessary to effect realignment between antenna and ground track being equal to the drift angle.

The Janus mixing process requires that a significant portion of return echoes from each pulsed beam of a pair arrive simultaneously. This coherency condition may not be met over irregular terrain using narrow pencil beams since the time spread over the beam due to the range difference corresponding to the beam extremities is small. On the other hand, the spectrum of the Doppler shift is a function of the $\gamma$ bandwidth and this should be kept small to enhance the signal strength and accuracy. This set of requirements dictates a beam which is narrow in the $\gamma$ direction, but which covers a broad interval of slant range ($\psi$) so that time overlap is insured for some part of the return from each beam. Thus the beam configuration represented in FIG. 1 generally meets these requirements. Observe that the cross-hatched areas represent the antenna's ground illumination patterns which in turn are defined by the half-power or 3 db point contour of each beam. As is well-known, linear planar array antennas are commonly used to generate these patterns one reason being that their radiation contours are conveniently confined to conical shells.

Now to understand why the prior art planar array antenna inherently suffers from calibration shift error consider a special case, illustrated in FIGS. 2a and 2b. The former illustrates a typical planar array illumination pattern comprising a long narrow strip in the direction of ground track. To simplify the analysis, the beam slant range angle $\psi$, is assumed to lie in the plane of the velocity vector V and all values of $\gamma$, the beam looking angle, are therefore complementary to $\psi$. As is well known, the power density of the Doppler signal backscattered from a land surface is a function of $\gamma$ and may be characterized by a Gaussian distribution. Thus, the curve representing the return signal power from the illuminated strip in FIG. 2a is shown by the solid line in FIG. 2b. Now assume the scattering surface to be water instead of land. As mentioned earlier, due to the specular nature of the former, the echo signal strength backscattered from the irradiated regions corresponding to larger values of $\psi$ is attenuated relative to the signal strength of the echo backscattered from the regions corresponding to smaller $\psi$ values. In effect, the return signals at larger $\psi$ values are progressively and increasingly discriminated against and therefore the power return distribution of the radiation backscattered from a water surface forms a slightly skewed Gaussian characteristic. This curve is designated by the broken line in FIG. 2b. As a result, the mean Doppler frequency $\nu_o$ over water is shifted to a lower value without a corresponding change in vehicle velocity. The actual extent of shift and thus velocity error depends on many factors including beam direction, beam shape and sea state but it has been found to run as high as 5% in practice.

To a first approximation the gain function of a linear array antenna may be expressed by the relation $$G_1 = F_1(\gamma, \psi) \quad (2)$$

In other words, the received signal amplitude is an inseparable function of $\gamma$ and $\psi$. Now if by some means the received beam could be reshaped such that the signal amplitude across its beam width varies as separable functions of $\gamma$ and $\psi$, respectively, then calibration shift could theoretically be eliminated. This result is possible because the Doppler spectral composition corresponding to the reshaped beam could be made to vary only in accordance with changes in its $\gamma$ function and be made independent of changes in $\psi$. Rewriting the gain function of this newly shaped beam we get $$G_2 = F_1(\gamma) \cdot F_1(\psi) \quad (3)$$

where $F_1(\gamma)$ and $F_1(\psi)$ are now factored separable functions.

The present invention provides an antenna assembly which is capable of shaping a composite beam whose gain function can be expressed in the form of Equation 3.

Accordingly, FIG. 3 depicts a triangular antenna assembly generally represented by reference character 10. The assembly consists of three microwave transmission elements 12, 14 and 16. In turn, each of these elements comprises a conventional linear array rectangular waveguide utilizing slot couplings for transferring microwave energy to and from free space. Such slotted waveguides are well-known in the art and therefore their theory and operation need not be presently described in detail. Suffice it to say that either the in-phase or the anti-phase type will satisfy the requirements of the invention. For example, each rectangular waveguide may include a series of parallel oblique slots in one of its narrow faces forming an in-phase array. Alternatively, each array may consist of a double series of oblique slots, alternate slots being parallel, in one of the narrow faces of the rectangular guide, forming an anti-phase radiator. Another satisfactory form of linear array may comprise a rectangular guide having shunt slots alternating on opposite sides of the center line of its broad face, forming an anti-phase array. As is well-known, when all the slots are located on the same side of the center line the array is of the in-phase kind. Also, the coupling elements in each waveguide may take other well-known forms such as dipoles, for example, and are not limited solely to slots, the latter being preferred merely because of their simplicity. It will be apparent that the particular type of linear array used in the antenna assembly is not at all critical. Any well-known form of linear array may be used. It is important only that the linear array has the capability of being fed from either end to produce a conical shell of radiation away from the feed end having a mean half angle $\gamma$ with respect to the array's longitudinal axis. This state of affairs is represented in FIG. 4.

Returning to FIG. 3, the waveguide 12 is adapted to be alternately fed at either end by a conventional Doppler transmitter (not shown) to provide the ground illumination patterns 1 and 2. Preferably, waveguides 14 and 16 are each disposed at 45° angles relative to waveguide 12, the angles being measured in the plane common to all the waveguides. This results in the compact right triangular configuration generally indicated. It is to be noted, however, that the invention does not necessarily require a right triangular configuration, hence values other than 45° may be chosen. It is essential only that waveguides 14 and 16 be angularly disposed relative to waveguide 12. Waveguide 14 is adapted to be alternately coupled at either end to a conventional Doppler receiver (not shown) for receiving echo signals from areas corresponding to the ground illumination patterns 5 and 6. In similar fashion, waveguide 16 is adapted to be coupled at either end to the receiver for receiving reflected ground signals corresponding to the beam areas 3 and 4. As a result of angularly disposing the receiver waveguides relative to the transmitter waveguide their respective beam patterns overlap in the regions generally indicated by the cross-hatched areas in FIG. 3. Inasmuch as these cross-hatched areas represent the ground illumination contours actually seen by the receiver waveguides, it is apparent that new composite beams A, B, C and D are generated by antenna assembly 10.

FIG. 5 is a geometrical detail of the ground illumination pattern associated with composite beam A, the latter as shown in the X–Y plane of FIG. 3. Inspection thereof reveals that isodop 22 corresponding to the $\gamma$ function of the angularly disposed receiver waveguide 16 crosses and overlaps isodop 18 which latter is defined by the $\gamma$ function of transmitter waveguide 12. At the point of overlap indicated by reference character 17, isodop 22 is tangent to constant slant range line 19 which latter may be identified by the expression $$\psi_0 = K \quad (4)$$

Now expressing the gain function of the antenna assembly as the product of the gamma functions of the transmitter and receiver arrays, respectively, we get $$G_{TR} = F(\gamma)_T \cdot F(\Delta)_R \quad (5)$$

where $F(\Delta)_R$ represents the angularly displaced gamma function of the receiver array. At point 17 where isodop 22 is tangent to $\psi_0 = K$, it can easily be shown that $\Delta = 90° - \psi_0$. Therefore the gain function of the antenna may be rewritten as $$G_{TR} = F(\gamma_1) \cdot F(90° - \psi_0) \quad (6)$$

which it will be recognized is in the form of Equation 3. What this really means is that the gain function of the center of beam A which is generated by the triangular antenna array is equal to the product of separable functions of $\gamma$ and $\psi$, respectively. Furthermore at point 17, $\psi = \psi_0 = $ constant, yielding the desired result, namely that the spectral composition of the return Doppler signal is now only a function of $\gamma$. Hence, there is no calibration shift error.

Obviously, the above treatment is valid only at the point 17 where the isodops intersect and it is assumed that the respective gamma beam widths are infinitely narrow. In actuality the gamma beam widths are finite as represented by contours 20, 21 in FIG. 5 and the area of overlap is relatively broad as indicated by cross-hatched area 17'. Nonetheless it has been found that the area 17' defined by the overlapping gamma contours can be made sufficiently small in practice (by selecting properly designed waveguide radiators, for example) to reduce calibration shift to relatively negligible limits. For example, the novel technique proposed herein has actually been found to reduce calibration shift error by a magnitude of 10 vis-a-vis prior art planar array antennas. Moreover, the triangular antenna configuration according to the present invention is utterly simple in construction, economical to fabricate and light in weight, and is therefore admirably suited for use in continuous wave Doppler systems operating in the space duplex mode. When this is done, the dual problems of transmitter leakage and calibration shift may be simultaneously solved without resort to extraneous and complex microwave equipments.

It is recognized that the new composite beams (A–D, FIG. 3) shaped by the triangular array antenna will result in the formation of relatively narrow pencil-like beams. As just mentioned, however, the antenna is intended for use in continuous wave Doppler systems which exhibit inherent coherency and therefore the problems mentioned previously relative to using pencil beams in a pulsed Doppler system will not exist.

The control system for selectively switching the triangular antenna assembly to produce the beam patterns A–D shown in FIG. 3 will now be described with particular reference to FIG. 6.

The control system illustrated in the latter is adapted to generate each beam serially on a time sharing basis but this is done only by way of example and should not be construed as limiting the invention. For example, it will occur to those skilled in the art that the system could be obviously modified to obtain alternating pairs of beams as well. Furthermore, it will be assumed that the triangular antenna assembly is to be used in conjunction with a Doppler navigator utilizing the Janus mixing process as previously described. Thus, it is to be assumed that the antenna assembly 10 is horizontally stabilized aboard the aircraft and that the longitudinal axis of the transmitter waveguide 12 is aligned along ground track.

Conventional Doppler transmitter 70 is coupled at either end to transmitter waveguide 12 via feed waveguides 50, 51. In a similar manner, conventional Doppler receiver 60 is coupled to either end of receiver waveguides 14, 16, respectively, via common waveguide T 52 and feed waveguides 53, 54, respectively. Each waveguide 12, 14, 16 is match terminated at both ends with a tapered block 80 of suitably lossy material such as, for example, carbon. A plurality of microwave switching diodes are disposed within the radiating waveguides and certain feed waveguides as shown. Since the constructional details of a microwave switching diode form no part of this invention, they will not be further described. As is well known, the behavior of the diode is such that when placed within a waveguide and biased with a suitable voltage it acts as a barrier to the impinging microwave energy. If there is no voltage drop across the diode the microwave energy traveling through the waveguide remains unimpeded as if the diode were not there. Stated simply, the microwave diode may be considered as the analog of a single-pole double-throw switch having stable states corresponding to an open circuit and a closed circuit. Inspection of FIG. 6 will indicate that the switching action of each diode is controlled by the operation of make or break switch contacts in the diode biasing circuits. For example, consider waveguide 14. When the latter is illuminated by the beam 6 as shown in FIG. 3, diode 31 is open thus terminating the waveguide in the matched load immediately to the left of that diode as seen in FIG. 6. Likewise, diodes 42, and 30, are open to permit the feeding of the microwave echo signal to receiver 60 via feed waveguides 53 and 52. Diode 32 is closed to prevent waveguide 14 from being terminated at both ends. Similarly, diodes 40 and 41 are closed to prevent leakage of the echo signal into the receiver waveguide 16 and the other end of receiver waveguide 14, respectively. Recalling that a closed diode corresponds to a biased diode, a voltage drop is developed across diodes 32 and 41 via voltage source 37, closed switch contact 63 and closed switch contact 62. Diode 40 is biased in similar fashion through voltage source 38, and closed switch contact 76. On the other hand, diodes 31, 42 and 30 are all open because their respective switch contacts 51, 54 and 75 are, likewise, all in the open position. The switch contacts are mechanically actuated by suitable linkages indicated by the broken lines in FIG. 6. A programmer 79 is provided for selectively actuating the switches by means of additional mechanical linkages 47, 48. The programmer may be of any convenient type, but preferably it consists of an electrical-to-mechanical transducer such as, for example, a latching relay and solenoid combination. The programmer itself may be clocked by any suitable means such as pulse generator 78, for example.

At the same time waveguide 14 is receiving echo signals corresponding to ground illumination pattern 6, assume that transmitter waveguide 12 is to operate in a space duplexed manner and is to transmit microwave energy corresponding to the ground illumination pattern 1 in FIG. 3. Microwave energy is fed from conventional Doppler transmitter 70 via feed waveguides 50, 51 to transmitter waveguide 12 where it enters immediately to the left of diode 36. A voltage is impressed across the last mentioned diode as well as diode 45 by voltage source 39 and respective closed switch contacts 72, 71. The microwave signal therefore travels through the waveguide from right to left as depicted in FIG. 6 and is radiated through slot couplings S to form the ground illumination pattern designated by reference character 1 in FIG. 3. Since waveguide 14 is simultaneously receiving the ground echo signal in the region designated by reference character 6 in FIG. 3, new composite beam D is being shaped by the antenna assembly.

At a moment later in time, a clocked pulse appears at the output of pulse generator 78 and activates programmer 79. As a result, mechanical linkage 48 simultaneously moves switch contact 75 into its closed circuit position and switch contact 76 into its open circuit position. Consequently, previously opened diode 30 closes, previously closed diode 40 opens, and receiver 60 couples to waveguide 16. In addition, waveguide 14 becomes isolated from the receiver 60. All of the while, transmitter waveguide 12 is still irradiating the ground with illumination pattern 1.

In waveguide 16, diodes 34 and 43 are closed via switch contacts 67, 66, respectively, and voltage source 38. This waveguide, therefore, is now receiving the ground echo signals from the illumination pattern 4, waveguide 12 having effectively been shut down. The result is a switchover from composite beam D to composite beam C as respects antenna assembly 10.

At still another moment later in time, the second pulse appears at the output of pulse generator 78 and activates programmer 79. However, this time both linkages 47 and 48 are energized. Thus, not only is there switchback from waveguide 16 to waveguide 14 via selective operation of diodes 30, 40 but in transmitter waveguide 12 diodes 36, 45 are opened and diodes 35 and 46 are closed via their respective switch contacts 69, 71, 72, 73. What this means is that now the transmitter waveguide is being fed microwave energy from its other end and therefore is radiates a beam corresponding to ground illumination pattern 2 in FIG. 3. Furthermore, in waveguide 14 additional switching has occurred between diodes 32, 41 on the one hand and diodes 31, 42 on the other via their respective switch contacts 61–64. Thus, the end of the waveguide closest to diode 31 is coupled to receiver 60 and, accordingly, the waveguide receives ground echo signals from the region of illumination pattern 5, FIG. 3. Composite beam B is thus being generated by the antenna assembly.

Finally, when the third pulse in the time cycle appears at the output of pulse generator 78, programmer 79 is once more activated. However, only linkage 48 is energized with the result that waveguide 14 shuts down and waveguide 16 is coupled to receiver 60 via movement of switch contacts 75, 76 and the latter's effect on diodes 30, 40. Inasmuch as switch contacts 65–68 had changed their respective positions in response to the second pulse, diodes 33, 44 remain closed and waveguide 16 receives the ground echo signals from the region indicated by reference character 3 in FIG. 3. All this time waveguide 12 has been transmitting beam 2 and therefore composite beam A is being generated by the antenna assembly.

In reviewing the operation of the antenna control system it is considered helpful to refer to the following table wherein the switching logic used in controlling the formation of each composite beam is conveniently summarized:

| Beam | Diodes Open | Diodes Closed |
| --- | --- | --- |
| Beam A | 36, 45, 34, 43, 40 | 35, 46, 30, 33, 44 |
| Beam B | 45, 36, 30, 32, 41 | 35, 46, 40, 31, 42 |
| Beam C | 35, 46, 40, 33, 44 | 36, 45, 30, 34, 43 |
| Beam D | 35, 46, 30, 31, 42 | 45, 36, 40, 32, 41 |

Since the composite beams are serially generated on a time sharing basis, it is obvious that they may be switched at any suitable rate. In passing, however, it is noted that excellent results have been achieved utilizing a beam switching rate on the order of 10 cycles per second. And, although the subject antenna has been particularly disclosed in the context of a four beam Janus configuration, this was done merely by way of example. Clearly, more or less than four composite beams may be generated by the antenna without departing from the principles of the invention.

Thus, while the present invention has been described with a degree of particularity for the purposes of illustration, it is to be understood that all equivalents, alterations and modifications within the spirit and scope of the present invention are herein meant to be included.

What is claimed is:
1. An antenna assembly comprising;
first electromagnetic wave transmission means aligned in a first longitudinal direction for transmitting a beam of electromagnetic energy toward a scattering surface,
second electromagnetic wave transmission means aligned in a second longitudinal direction for receiving electromagnetic energy backscattered from said surface, third electromagnetic wave transmission means aligned in a third longitudinal direction for receiving electromagnetic energy backscattered from said surface, said second and said third longitudinal directions being respectively disposed at an angle relative to said first longitudinal direction, said angle being measured in a plane common to all the directions and parallel to said surface.

2. The microwave antenna of claim 1 in which the magnitude of angular disposition between said second direction and said first direction is 45° and between said third direction and said second direction is 90°.

3. A microwave antenna system comprising;
a first linear array for transmitting alternately fore and aft beams of electromagnetic energy toward a reflective surface,
a second linear array for receiving fore and aft beams of electromagnetic energy reflected from said surface,
a third linear array for receiving fore and aft beams of electromagnetic energy reflected from said surface,
said second array and said third array each being disposed at an angle relative to said first array, said angle being measured in a plane common to all of the arrays and parallel to said reflecting surface.

4. The microwave antenna system of claim 3 further comprising;
electromagnetic wave generating means,
electromagnetic wave detecting means,
switching means for alternately coupling said generating means to each end of said first linear array and for alternately coupling said detecting means to each end of second and third linear arrays respectively, and
programming means operatively associated with said switching means for actuating the latter in a predetermined sequence whereby at varying moments in time a different end of said first array is coupled with said generating means while simultaneously a different end of one of said second or third arrays is coupled to said detecting means.

5. The microwave antenna system of claim 4, in which each of said linear arrays comprises a rectangular waveguide having electromagnetic wave coupling elements disposed in one of its faces.

6. The microwave antenna system of claim 4, in which said switching means comprises a plurality of microwave switching diodes and said programming means includes a pulse generator for actuating said microwave switching diodes in said predetermined sequence.

7. The microwave antenna system of claim 4, in which each of said first, second and third linear arrays is match terminated at each of its ends respectively with electromagnetic wave absorption means.

8. The microwave antenna system of claim 4, in which the magnitude of angular disposition between said first array and said second and third arrays respectively is 45°.

9. A microwave antenna assembly for use in a continuous wave Doppler radar system operating in the space duplex mode, said system including separate isolated electromagnetic wave generating and receiving means respectively, the combination comprising;
first linear array rectangular waveguide means connected at each of its ends to said generating means,
second linear array rectangular waveguide means connected at each of its ends to said receiving means,
third linear array rectangular waveguide means connected at each of its ends to said receiving means,
said second array means and said third array means each being fixed in space at an angle relative to said first array means, said angle being measured in a plane common to all the arrays, and
control means for selectively coupling only one end of said first array means to said generating means and for simultaneously coupling only one end of either said second or third array means to said receiving means.

10. The microwave antenna assembly of claim 9, in which said control means includes sequencing means for alternately coupling each end of said first array means to said generating means and for simultaneously coupling a different end of said second and third array means respectively to said receiving means, whereby at periodically varying intervals in time a different end of said first array means is coupled to said generating means and a different end of said second or third arrays is coupled to said receiver means.

11. The microwave antenna system of claim 9 in which said angle is 45°.

References Cited

UNITED STATES PATENTS 3,281,851   10/1966   Goebels _____ 343—9 X

RICHARD A. FARLEY, *Primary Examiner.*

CHARLES L. WHITHAM, *Assistant Examiner.*

U.S. Cl. X.R.

343—771, 893